United States Patent [19]

Crouter et al.

[11] 3,780,735
[45] Dec. 25, 1973

[54] DOSE SYRINGE

[76] Inventors: John A. Crouter, 1400 S. Elms Rd., Flint, Mich. 48504; Richard J. Havas, 10259 W. Bristol Rd., Swartz Creek, Mich. 48473

[22] Filed: Feb. 3, 1972

[21] Appl. No.: 223,243

[52] U.S. Cl. ............................... 128/223, 128/264
[51] Int. Cl. ...................... A61d 7/00, A61m 31/00
[58] Field of Search .................. 128/264, 261, 263, 128/271, 222, 223

[56] References Cited
UNITED STATES PATENTS

| | | | |
|---|---|---|---|
| 3,667,465 | 6/1972 | Voss | 128/271 |
| 2,754,822 | 7/1956 | Emelock | 128/264 |
| 3,015,332 | 1/1962 | Brecht | 128/263 |
| 3,238,941 | 3/1966 | Klein et al. | 128/264 |
| 2,724,385 | 11/1955 | Lockhart | 128/261 |
| 2,764,982 | 10/1956 | Lutge | 128/223 |
| 3,424,158 | 1/1969 | Silver | 128/271 |
| 2,587,364 | 2/1952 | Mitchell | 128/264 |

Primary Examiner—Richard A. Gaudet
Assistant Examiner—J. C. McGowan
Attorney—Charles R. White

[57] ABSTRACT

This dose syringe for animals has a plunger disposed for longitudinal movement in a tubular barrel. A medicating pill is held in the end of the barrel by radially and inwardly extending tabs hinged to front end of the barrel. A plunger longer than the barrel is fitted for longitudinal movement therein. When the plunger is stroked, the smooth tip of the plunger pushes the medicating pill over the base of the tongue while holding the tongue down so that the animal swallows the pill without gagging or similar distress. The plunger is tubular with a longitudinal passage completely therethrough and may be used to administer liquid medication to an animal.

1 Claim, 4 Drawing Figures

PATENTED DEC 25 1973 3,780,735

DOSE SYRINGE

This invention relates to a new and improved dose syringe for dispensing medicine in pill, capsule or liquid form to animals through their mouths without their gagging or choking.

In large animals such as horses, cows and sheep there is generally sufficient room between the roof of the mouth and tongue to insert the tip of a medicine-dispensing device on or over the base of the tongue. However, in smaller animals such as small dogs and cats the clearance between the base of the tongue and the roof of the mouth is quite small and the tuilization of the prior dose syringes and other similar dispensing devices has been only marginally successful. Generally the placement of prior-art devices in the mouth cavity causes the animal to sense a blockage of the throat resulting in the animal's gagging and becoming impossible to restrain and medicate.

The present invention is drawn to a light-weight and easily-handled dose syringe which can be employed to orally dose small animals with pills, capsules and liquids without distress. The barrel of the dose syringe is in itself sufficiently small and so shaped that it can be placed within the mouth and on the tongue of such small animals without the animal experiencing a choking sensation. A plunger disposed within the barrel can be stroked so that it quickly ejects the pill of capsule held in the barrel. As the plunger is stroked, its tip projects substantially beyond the end of the barrel to progressively contact the base of the tongue. This pushes and holds the tongue down until the pull, pushed by the tip of the plunger, is over the base of the tongue. Once the pill is in this position, the animal has no recourse but to swallow the medication. Thus, with this invention it is possible to administer medications to animals including small dogs, cats, etc., without causing undue distress such as gagging and choking. The plunger has a longitudinal passage therethrough with a capacity to contain sufficient liquid medication for dosing the animal through its mouth. If desired, this plunger may be used as a funnel to dose the animal with such liquid medication.

In the preferred embodiment of this invention the dose syringe is a two-part device of a relatively-soft plastic material, such as Polypropylene, to substantially eliminate the possibility of injury to the tongue, palate or other parts of the mouth. The syringe comprises an outer tubular barrel having inwardly and radially disposed tabs formed at one end to hold pills and capsules within the barrel. Disposed for longitudinal movement in the barrel is a hollow, tubular plunger, longer than the barrel, and designed so that the tip of the plunger will travel beyond the end of the barrel when the plunger is stroked.

With this construction a pill, capsule or similar medication is pushed ahead of the tip of the plunger depresses the tongue of the animal being dosed. Since the base of the tongue of the animal is held down by the plunger and since the tip of the plunger is small, the animal does not sense blockage of the throat and thus does gag. The medication being deposited over the base of the tongue is then swallowed without distress.

With the preferred embodiment of this invention, liquid medication can be readily dispensed. The plunger has a longitudinal passage completely therethrough and can be removed from the barrel and held between the first two fingers. The plunger is inserted into the bottle containing the liquid medication to a desired depth enabling the appropriate amount of medication to enter into the passage of the plunger. The thumb is then placed over the upper end of the plunger so that the liquid is trapped in the plunger by atmospheric pressure. The plunger is then inserted to a proper position within the animal's mouth and the thumb is then removed from the end of the plunger to release the liquid medication. The animal is thus dosed with the liquid medication by gravity feed. This sharply reduces the possibility of any liquid being forced into the lungs as with prior-art syringes. If desired, the plunger can be used to dispense liquid medication while in the barrel. It can also be used as a funnel with the medication being poured through the opening in the upper end for gravity feed.

In any case dosage of animals, particularly those with short muzzles is optimized. The animal can usually be held with one hand and the syringe inserted with the other to the appropriate position in the mouth. The animal is then medicated; the syringe is withdrawn, disassembled and sterilized for further use when needed.

It is a feature, object and advantage of this invention to provide a new and improved dose syringe for administering pills, capsules and liquid medications to animals without their gagging and becoming difficult to restrain.

Another feature, object and advantage of this invention is to provide a new and improved dose syringe in which the syringe comprises a two-part unit with a longitudinally-movable plunger, disposed within a supporting barrel, and has a tip that progressively travels beyond the end of the barrel as it is stroked to depress and push a pill or capsule over the base of the tongue of the animal being dosed so that it will take the medication without becoming gagged and generally without being restrained.

Another feature, object and advantage of this invention is to provide a new and improved two-part dose syringe which can be held and operated in one hand having a barrel of tubular construction with inwardly disposed retaining fingers to hold a pill, capsule or other solid medication within the barrel and in which there are longitudinally extending ribs to support the plunger within the barrel so that the pill can be administered to the animal in a smooth stroking action applied to the plunger.

Another feature, object and advantage of this invention is to provide a new and improved dose syringe which can be held and operated in one hand and in which there is a hollow plunger that can be readily employed to dispense liquid medication to an animal by gravity feed while holding the animal with the other hand.

These and other features, objects and advantages of the invention will become more apparent from the following detailed description and drawings in which.

Figure 1:
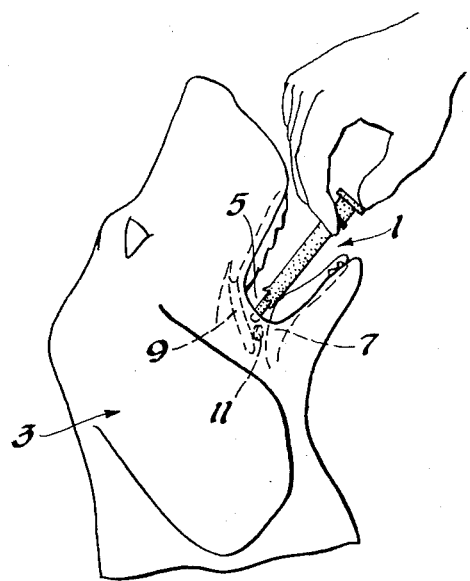
FIG. 1 is a side view illustrating a dose syringe according to this invention being employed to dose a small animal.
Figure 2:
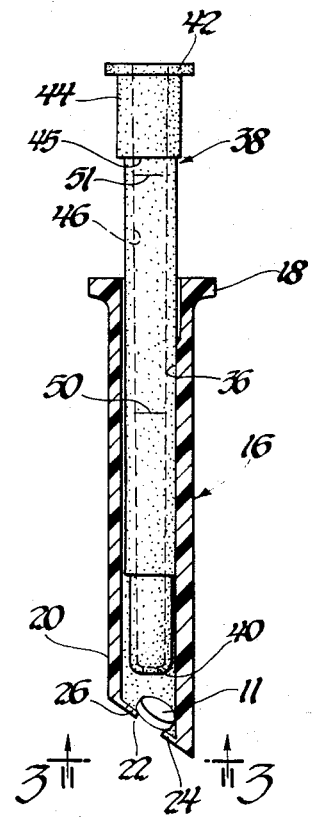
FIG. 2 is a side view, partially in section, showing the two major components of a dose syringe according to this invention disposed in a loaded position and ready for operation.
Figure 3:
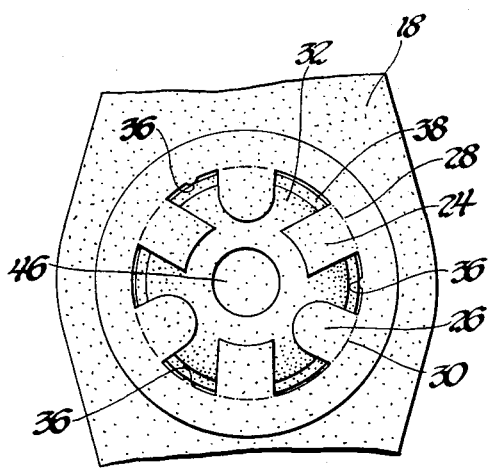
FIG. 3 is a view taken along line 3—3 of FIG. 2.

Turning now to the drawings in greater detail, there is shown in FIG. 1 a dose syringe 1 according to this invention being hand held and disposed in the mouth of a small animal 3. The opening 5 between the tongue 7 and the soft palate 9 of the animal is quite small so that this syringe has an important function as a tongue depressor as well as a dosing device. The syringe is shown immediately after dosing the animal with the medication here in the form of a wafer-type pill 11.

The dose syringe comprises an elongated tubular body member or barrel 16 preferably of a yieldable plastic such as polypropylene having a flat upper flange 18 to provide a holder for the fingers of the hand used to dose the animal. The barrel is open at both ends. The forward end 20 of the barrel is slanted at 22 to reduce its bulk so that the syringe can be inserted into the animal's mouth without causing gagging. Extending radially inwardly at the slanted end of the barrel are a plurality of tabs 24, 26 which are live-hinged at 28 and 30 to the inside wall of the opening formed in the forward end of the barrel. The tabs are designed to hold the medication such as the pill 11 in the barrel until the medication is ejected within the mouth of the animal. Disposed on the inside wall of the barrel are three longitudinally extending ribs 36 which contact and slidably support a tubular plunger 38.

The plunger is also of a suitable plastic material such as polypropylene and is formed with a rounded front tip 40 which is adapted to engage the pill 11 when the plunger is stroked. The plunger has a flat top plate 42 which serves as a grip for removing the plunger from the barrel and as a finger rest for stroking the plunger. The plunger is longer than the barrel so that the tip 40 will project beyond the barrel when the plunger is fully stroked as shown by FIGS. 1 and 4.

Figure 4:
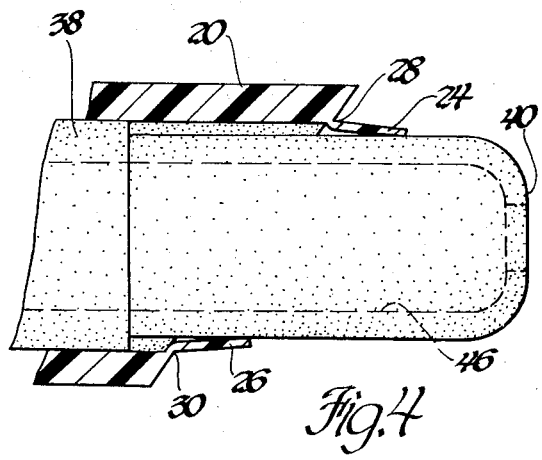
FIG. 4 is a fragmentary side view showing the dose syringe of this invention with the tip of the plunger extending beyond the end of the barrel.

The plunger is formed with a shoulder 44 whose bottom edge 45 contacts the top of barrel flange 18 to limit the stroke of the plunger to the maximum stroke shown in FIGS. 1 and 4. Preferably the end of the plunger is of reduced diameter so that the animal will be less likely to sense blockage of the throat. The plunger has a linear passage 46 completely therethrough which may be used to hold liquid medication. Suitable indicia 50 and 51 enscribed on the plunger can be used to indicate particular amounts of liquid that can be held within the passage 46, such as ½ and 1 teaspoon for example.

When loading the syringe with liquid medication, the plunger preferably is removed from the barrel 20 and held between the first two fingers. Then it is placed into the container of liquid medication until the appropriate amount of liquid enters the passage 46. By placing the thumb over the opening of passage 46 in the top plate 42 the medicine is trapped by atmospheric pressure. While holding the animal with one hand, the plunger is then inserted into the mouth of the animal with the tip depressing the tongue. The thumb is removed and gravity forces the liquid out of the lower end of the plunger. This gentle medicating method substantially eliminates the possibility of forcing the liquid into the animal's lungs as in the case with some prior syringes. If desired, the plunger could be similarly employed while still in the barrel. Also, the plunger could be used as a funnel with plate 42 being conical in shape to provide a better receptacle for the liquid.

To load the dose syringe with a pill or capsule, the plunger 38 is removed from the barrel and the pill 11 is dropped into position against the tabs 26 and 28; the plunger is then inserted into the barrel riding on the three ribs 36. The close fit of the plunger on the ribs permits the syringe to be used with one hand as illustrated in FIG. 1, allowing the other hand to be maintained free to hold the animal and open its mouth. The passage 46 in the plunger provides a breather passage for the animal if the user does not completely block the passage with his thumb. After the dose syringe has been properly placed in the animal's mouth, the plunger is then quickly stroked with the thumb. The reduced-diameter tip of the plunger contacts the pill 11 forcing it out of the plunger while deflecting the tabs 42 and 26 outwardly as shown in FIGS. 1 and 4. As the plunger strokes outwardly, pushing the pill ahead, it contacts and depresses the base of the tongue. When the pill is over the base of the tongue, it is readily swallowed by the animal without difficulty. The syringe is then withdrawn and prepared for subsequent usage. When the tip of the plunger is moved back into the barrel and out of contact with the tabs 24, 26, the tabs will flex back to their original position so that another pill can be loaded into the barrel. The two components of this syringe can be quickly disassebled and sterilized to be ready for other medication.

Although this invention has been described in connection with dosing animals such as cats and dogs and the like, it may have human usage. For example, it could be used by persons having difficulty in swallowing medications as well as by infirm persons.

While a preferred embodiment of this invention has been shown and described, it will be apparent that there are other embodiments which will now be readily apparent to those skilled in the art. Accordingly, this invention is to be limited not by that which has been shown and described for illustrating the invention but only by the following claims defining the invention.

What is claimed is:

1. A dose syringe for dispensing pill or capsule type medication to an animal through the mouth of the animal comprising an elongated tubular body member having a predetermined length and forward and back ends, said back end having projecting means extending outwardly therefrom to provide for the manual holding of said body member, said forward end having a fixed and constant diameter, said body member having a longitudinally extending cylindrical passage of a constant diameter which extends completely through said body member and the forward and rear ends thereof, flexible retainer means extending radially inwardly from said forward end of said body member for yieldably and partially blocking said cylindrical passage to confine a pill or capsule loaded therein, an elongated cylindrical plunger for fitting into said body member, said plunger having a cylindrical forward end portion of uniform cross section and a rounded front tip, said plunger having a length greater than the length of said body member by an amount at least equal to the diameter of said forward end portion of said plunger, mounting means operatively disposed between said plunger and said body member to support said plunger for uninhibited longitudinal sliding movement in said longitudinal passage of said body member, said plunger being insertable into said longitudinal passage in telescoping relationship with said body member so that said front tip is disposed between the ends of said body member and above a pill or capsule confined therein, said plunger having a rear portion extending longitudinally beyond the rear of said body member, a finger rest fixed to said rear portion of said plunger allowing said plunger to be manually stroked relative to said body to completely extend said forward end portion and said front tip of said plunger by a distance from said front end of said body member equal to at least the diameter of said forward end portion without expanding said body member so that said forward end portion and said front tip depresses the tongue of the animal as the pill or capsule is moved forwardly from the body member over the base of the tongue of the animal thereby causing the animal to swallow the pill or capsule without gagging.

* * * * *